United States Patent
Carraz et al.

[15] 3,671,532

[45] June 20, 1972

[54] COMPOSITION AND METHOD FOR LOWERING THE BLOOD SUGAR CONTENT OF DIABETIC MAMMALS

[72] Inventors: Gilbert L. Carraz, St. Jean de Moirans; Andre Boucherle, Grenoble, both of France

[73] Assignee: Societe De Recherches Industrielles S.O.R.d., Dijon, France

[22] Filed: March 6, 1967

[21] Appl. No.: 620,631

[30] Foreign Application Priority Data

Aug. 5, 1966 France............................................838
Dec. 29, 1966 France............................................844

[52] U.S. Cl..............................................424/305, 424/317
[51] Int. Cl. ........................................................A61k 27/00
[58] Field of Search ..............260/514; 167/65 AD; 424/317, 424/305

[56] References Cited

OTHER PUBLICATIONS

Annals of the New York Academy of Sciences, Smith et al., Vol. 141 3/15/67
Federal Register, Title 21, Subchapter A, part 3, 12/23/66
Merck Index, p. 373, 1960

*Primary Examiner*—Sam Rosen
*Attorney*—Otto John Munz

[57] ABSTRACT

The invention relates to a method of lowering the blood sugar content in mammals by exploiting the hypoglycemic activity of certain pentacyclic triterpene derivatives such as mixtures of glycyrrhetinic acids and their esters, to treat obese diabetic subjects.

3 Claims, No Drawings

COMPOSITION AND METHOD FOR LOWERING THE BLOOD SUGAR CONTENT OF DIABETIC MAMMALS

BACKGROUND OF THE INVENTION

1. Field of the Invention

A method of treatment of mammals, particularly human beings, suffering with diabetes independently of insulin treatment by administering to them orally effective doses of a novel medicinal composition for the purpose of acting upon hyperinsulinemic diabetes (diabetes with obesity whereby the Langerhans islands are prevented from being exhausted.

2. Description of the Prior Art

There are several etiological factors of diabetes.

It is generally considered that these factors are linked with the joint functioning of the pancreas and liver and the effect of insulin on glucose catabolism.

It is known that through its islands of Langerhans, the pancreas secretes insulin (beta cells), and glucagon (alpha cells). Insulin is the principal natural hypoglycemic factor of the organism, which particularly promotes the catabolism of glucose. Glucagon, on the contrary, is a hyperglycemic factor acting on the liver, whose glycogenic reserves it mobilizes.

A normal glycemia results from a balance established between:

the insulin secretion output, the glucagon secretion output, and other factors such as those that can oppose the cellular action of insulin and/or excite hepatic glycogenolysis.

If there is deficiency of insulin provided by the beta cells, the cellular catabolism of the glucose is insufficient. It is a case of lean diabetes (hypoinsulinemic diabetes).

The prior art recognizes two principal modes of treating this type of diabetes, namely, by administration of insulin, which replaces natural insulin, or preparations, such as sulfas, for example, which are now considered to stimulate the beta cells of the islands of Langerhans of the pancreas.

In fat diabetes (diabetes with obesity), the present accepted interpretation is the following: there is, at the same time, hyperglycemia and hyperinsulinemia through the effect of ill-use of glucose at the muscle level. This hyperglycemia entails hyperinsulinemia with an exhausting of the beta cells as a late consequence. The failure of the entry of the glucose into the muscle results, as a second consequence, in that the excess of glucose, under the influence of the insulin itself in excess, entails an increase of lipidogenesis, which is demonstrated by the fact that the epididymal fat of the rat is doubled in the presence of glucose and increased tenfold in the presence of glucose and insulin.

The present treatment of fat diabetes consists in a suitable diet. After exhausting of the beta cells (final phase of the malady), insulinotherapy is necessary.

In this area, it is known that pyridoxine, acting as a co-enzyme, participates in the degradation of the lipides, thus intervening in the possible treatment of the fatty overload; but it does not act on the glycemia.

SUMMARY OF THE INVENTION

The objects of the invention are:

To treat fatty diabetes, and more particularly to obtain metabolism of the glucose independent of any action of the insulin (--; the hypoglycemic action of the treatment avoids the exhausting of the islands of Langerhans--)--;

To provide means making it possible to obtain the metabolism of the glucose independently of any action of the insulin;

To provide medicinal preparations containing pentacyclic triterpene derivatives to treat certain cases of human diabetes, particularly fat diabetes; and To establish optimum means of administering these medicinal preparation in specific effective dosages.

In accordance with the invention, the following hypoglycemic medicinal compositions were established as most effective comprising alpha-glycyrrhetinic acid, beta-glycyr-rhetinic acid, and the methyl esters of these acids.

BRIEF DESCRIPTION OF THE PREFERRED EMBODIMENT

The medicinal preparation of the invention includes triterpene derivatives such as alpha- or beta-glycyrrhetinic acid, and certain of their derivatives, and more particularly liposoluble methyl ester and other derivatives, salts or hydrosoluble esters, with a suitable pharmaceutical carrier.

The medicinal preparation is administered orally in the form of tablets, pills or capsules with immediate or delayed action, in association with suitable pharmaceutical carrier, in doses varying from 7 to 15 grains (0.50 to 1 gr.), to be scaled to weight, size and condition of the patient.

The properties of the novel medicinal composition according to the invention have been the object of pharmacological tests on animals under the following conditions.

The tests were made on female Swiss mice with an average weight 20 g. The preparation, in different concentrations, was injected intraperitoneally. The glycemia was noted before injection, then a certain time after injection. The blood was removed by decapitation, and the glycemia was immediately determined by the King Gartner method.

By way of example, the following table indicates the results found and the percentage of lowering of the glycemia sixteen hours after injection of the preparation in equal parts of beta-glycyrrhetinic acid and the methyl ester of this acid in solution in a suitable pharmaceutical carrier, dimethylsulfoxide, which by itself has no action on glycemia:

| Dose in mg. Per Mouse of 20 g. | Glycemia in g./l. | Percentage of Drop |
|---|---|---|
| 0 | 1.60 | 0 |
| 2 | 1.40 | 12% |
| 4 | 0.92 | 42% |
| 5 | 0.88 | 45% |
| 6 | 1.08 | 32% |

Pharmacological tests on a depancreatized dog were made to determine the mode of action of the above mentioned active principles on glycemia. After pancreatectomy, a hyperglycemia of 3.78 per thousand was noted in the dog. The active ingredients were administered orally in the form of capsules; 4 hours later, a drop of glycemia of the order of 30 percent was noted. This means that hypoglycemiatic action, therefore, took place outside the pancreas; it was not performed by means of insulin secretion.

Then, additional tests were run on fat hyperglycemic mice whose maximum hyperglycemia is reached between the ninth and 14th week after birth, with considerable glycosuria, polyuria, lower basal metabolism and high cholesterolemia. The hyperglycemia of these animals resists administration of insulin up to 20 I.U. per animal. Actually, it is a hyperinsulinemic diabetes: the insular volume of the pancreas is about 6 times greater than in normal mice. This transformation is accompanied by a hypertrophy of the beta cells. It is to be noted that in these mice, at an advanced age, hyperglycemia finally exhausts the reactive capacities of the islands of Langerhans, which leads to death in hypoinsulinemic coma with acidocetosis. Consequently, the physiopathological characteristics of this diabetes are comparable to those seen in human diabetes, known as "fat diabetes" which represents about 60 percent of diabetes.

In fat mice, it is found that beta-glycyrrhetinic acid and its methyl ester in oil emulsion intra-peritoneally, in a dose of 5 mg per mouse, causes, for example, a 86 percent glycemia drop (average of 10 mice). In a dose of 1.5 mg. the average drop of glycemia is still 68 percent.

It was found that if the treatment begins in time, i.e., during the hyperinsulinemic phase following the exhausting of the islands of Langerhans, this treatment generally prevents exhausting of these islands due to its regulating action on glycemia. Consequently, it avoids insulin treatment. In the present state of medical knowledge, it is known that insulin treatment is essential in the last phase of this type of diabetes, otherwise, diabetic coma is inevitable.

Additional tests made it possible to establish that alpha or beta isomerism of glycyrrhetinic acid and its derivatives has no effect on their hypoglycemic activity.

Various modifications are contemplated and may be obviously resorted to by those skilled in the art without departing from the spirit and scope of the invention as hereinafter claimed, as only preferred embodiments thereof have been disclosed.

What is claimed is:

1. A method of treating a obese diabetic animal to reduce its blood sugar content and simultaneously to avoid the exhaustion of the Langerhans islands of its body comprising administering to said animal an effective dosage, in the range of 7 to 15 grains of a preparation of equal parts of beta-glycyrrhetinic acid and the methyl ester of beta glycyrrhetinic acid in a pharmaceutical carrier.

2. A method for reducing the blood sugar content in obese diabetic mammals as claimed in claim 1, said step of administering being carried out during the hyper-insulinic phase prior to the hypo-insulinemic phase.

3. A composition for treating a obese diabetic animal to reduce its blood sugar content without exhausting its Langerhans islands comprising 7 to 15 grains of a composition of equal parts of beta-glycyrrhetinic acid and the methyl ester of beta-glycyrrhetinic acid in a pharmaceutical carrier, in the form of tablets, pills or capsules.

* * * * *